C. D. ANDERSON & E. STRENG.
LOGGING HOOK.
APPLICATION FILED FEB. 13, 1918.
1,273,717.
Patented July 23, 1918.
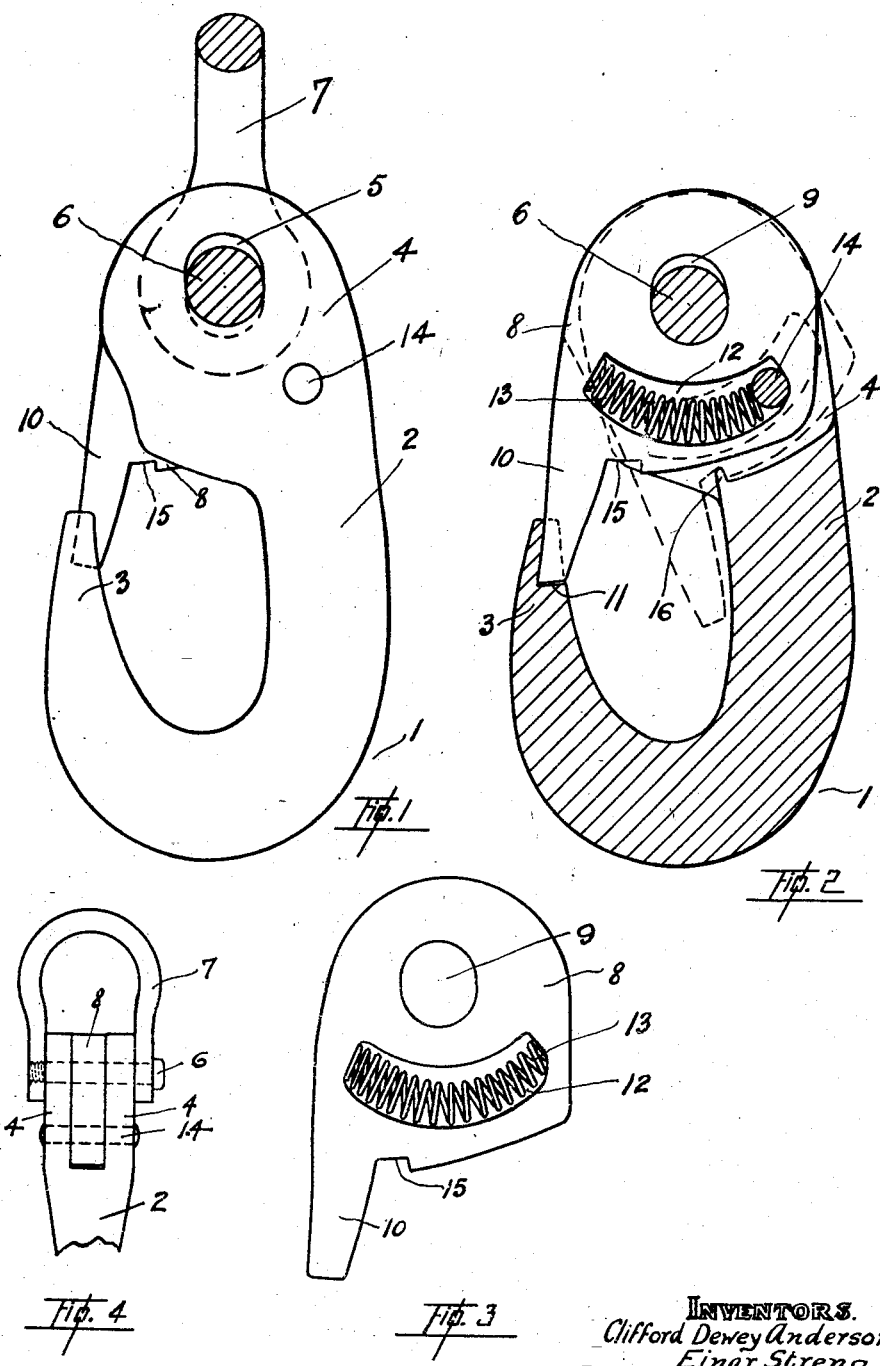
INVENTORS.
Clifford Dewey Anderson.
Einar Streng.
BY
ATTYS.

UNITED STATES PATENT OFFICE.

CLIFFORD DEWEY ANDERSON, OF KNOX BAY, AND EINAR STRENG, OF VANCOUVER, BRITISH COLUMBIA, CANADA.

LOGGING-HOOK.

1,273,717.  Specification of Letters Patent.  Patented July 23, 1918.

Application filed February 13, 1918. Serial No. 216,926.

*To all whom it may concern:*

Be it known that we, CLIFFORD DEWEY ANDERSON and EINAR STRENG, respectively, citizens of the United States and Finland, and residents, respectively, of Knox Bay and the city of Vancouver, in the Province of British Columbia, Canada, have invented certain new and useful Improvements in Logging-Hooks, of which the following is a specification.

Our invention relates to improvements in hooks, with particular reference to hooks used for yarding purposes in logging operations, although it may be used with equal facility in general logging or other similar work, and the object of our invention is to provide a hook by the use of which the load is securely held to the hauling line while at the same time connection and disconnection of the load line to and from the hook is effected with great ease and convenience.

We attain this object by the construction illustrated in the accompanying drawings in which—

Figure 1 is a side elevation of the hook.

Fig. 2 is a side view in part section.

Fig. 3 is a side view of the snap plate.

Fig. 4 is a view of the hook upper end showing the jaw formation.

Similar figures of reference indicate similar parts throughout the several views.

The hook, indicated generally by the numeral 1, is formed as shown in Figs. 1 and 2, having the shank 2 connecting the hook bill 3 with the jaws 4, in which jaws an oval hook eye 5 is formed, through which eye passes a pin or bolt 6 by means of which the line shackle 7 is connected to the hook.

Swingably mounted in the jaws 4 is a snap plate 8 also having an oval eye 9 formed therein, through which eye, when the device is assembled, also passes the bolt 6 to connect the plate 8 to the hook and on which bolt the plate swings. An extension 10 is formed on the front edge of the plate, which extension normally closes the hook entrance, its lower end resting in a recess 11 formed on the inside of the hook bill 3, as shown in Fig. 2. The plate 8 is further provided with a curved slot 12 in which is disposed a spring 13, the rear end of which bears against a pin or rivet 14 passed from side to side through the jaws 4 and the slot 12. The lower edge of the plate is cut away, or recessed, as at 15 in Figs. 1 and 2, which recess coöperates with an upstanding projection 16 formed on the hook shank 2 to lock the plate 8 in the dotted position shown in Fig. 2, as will be hereinafter described.

The operation of the device will be apparent, on reference being had to Figs. 1 and 2, as it will be seen that a line may be passed into the hook by pressing the line against the extension 10 to force the same inwardly against the spring 13, the line passing in through the hook entrance when the space between the extension 10 and the bill point is sufficiently wide, after which the extension 10 will be snapped back by the spring into normal position, as shown in Fig. 1 and in full in Fig. 2. When, however, it is desired to withdraw the line the extension 10 is pressed back by hand into the position indicated by the dotted lines in Fig. 2, in which position it is locked by the engagement of the projection 16 with the recess 15, the plate 8 dropping sufficiently, by reason of the oval shape of the eye 9, to permit such engagement. The line may then be passed freely in or out of the hook, the entrance of which is then kept open as long as the snap plate 8 and its extension 10 are maintained in the inwardly swung position. To close the hook entrance again an upward pull is exerted on the bolt 6 to raise the plate 8 and its recess 15 clear of the projection 16, whereupon the spring 13 will return the plate and the extension to their normal positions as shown in Fig. 1.

It will be seen, therefore, that we have devised a simple and practical hook which is of great convenience in logging and other haulage operations.

What we claim as our invention is:

1. In a hook, means for closing the hook entrance, said means being adapted to be swung inwardly to open the entrance, and means for locking the closing means in open position.

2. In a hook, means for closing the hook entrance, said means being adapted to be swung inwardly to open the entrance, means for locking the closing means in the open position, and means for returning the closing means to normal position when unlocked.

3. In a hook, a plate swingably mounted on the hook head provided with an extension normally closing the hook entrance, said plate having a recess in its lower edge, and a projection on the hook shank with which said recess coöperates to lock said plate and extension when the same are swung to open the said entrance.

4. In a hook, a plate swingably mounted on the hook head provided with an extension normally closing the hook entrance, said plate having a recess in its lower edge, a projection on the hook shank with which said recess coöperates to lock said plate and extension when the same are swung to open the said entrance, and a spring mounted on said plate adapted to be compressed when the said plate is swung to open the hook.

5. A hook having its head provided with an oval eye and a circular pin passing through said eye, a plate mounted on said head also having an oval eye through which said pin passes, and having an extension normally closing the hook entrance, said plate having a curved slot in its body and a recess in its lower edge, a projection on the hook shank with which said recess coöperates to lock said plate and extension when the same are swung to open the said entrance, a stationary pin passing through said slot at the rear end thereof and secured into the hook head, and a spring disposed in said slot to bear at its opposite ends on the end of the slot and the said pin respectively, said spring being under compression when the plate is swung to open the hook.

6. A hook having its head formed as a jaw provided with an oval eye and a circular pin passing through the eye, a plate mounted in the jaw provided with an oval eye through which the said pin passes to swingably connect the plate with the hook head, said plate being provided with an extension adapted to normally close the hook entrance and having a slot in its body and a recess in its lower edge, a projection on the hook shank with which the recess coöperates to lock the plate and extension when swung to open the said entrance, a pin carried by the said jaw passing through the said slot at the rear end thereof, and a spring disposed in the said slot extending between the pin and the front end of the slot.

CLIFFORD DEWEY ANDERSON.
EINAR STRENG.

Copies of this patent may be obtained for five cents each, by addressing the "Commissioner of Patents, Washington, D. C."